(12) United States Patent
Bousquet et al.

(10) Patent No.: US 8,516,910 B2
(45) Date of Patent: Aug. 27, 2013

(54) METHOD OF DEVELOPING AND CALIBRATING A TOOL FOR NON-DESTRUCTIVE INSPECTION OF PARTS OF A TURBOMACHINE

(75) Inventors: Sadia Bousquet, Moissy Cramayel (FR); Claude Robert Louis Lejars, Draveil (FR); Sylvie Mozer, Sivry Courtry (FR); Alain Timon, Paroy (FR)

(73) Assignee: SNECMA, Paris (FR)

( * ) Notice: Subject to any disclaimer, the term of this patent is extended or adjusted under 35 U.S.C. 154(b) by 471 days.

(21) Appl. No.: 12/832,534

(22) Filed: Jul. 8, 2010

(65) Prior Publication Data

US 2011/0010152 A1    Jan. 13, 2011

(30) Foreign Application Priority Data

Jul. 9, 2009    (FR) ...................................... 09 03399

(51) Int. Cl.
*G01N 17/02*    (2006.01)

(52) U.S. Cl.
USPC ........................ 73/865.6; 73/865.9

(58) Field of Classification Search
USPC .................... 73/865.8, 865.9, 865.6
See application file for complete search history.

(56) References Cited

U.S. PATENT DOCUMENTS

| 2006/0243051 | A1* | 11/2006 | Bui et al. ........................ 73/618 |
| 2010/0023157 | A1* | 1/2010 | Burgess et al. ............... 700/186 |
| 2010/0290909 | A1* | 11/2010 | Greciet et al. ................ 416/153 |

FOREIGN PATENT DOCUMENTS

| EP | 2 042 076 A2 | 4/2009 |
| JP | 2007212357 A * | 8/2007 |

OTHER PUBLICATIONS

S. O. Onuh, et al. "Rapid prototyping technology: applications and benefits for rapid product development", Journal of Intelligent Manufacturing, vol. 10, No. 3-4. 1999. pp. 301-311.
B. Wiedemann, et al. "Strategies and applications for rapid product and process development in Daimler-Benz AG", Computers in Industry, Elsevier Science Publishers, vol. 39, No. 1, 1999, pp. 11-25.

* cited by examiner

*Primary Examiner* — Hezron E Williams
*Assistant Examiner* — Nashmiya Fayyaz
(74) *Attorney, Agent, or Firm* — Oblon, Spivak, McClelland, Maier & Neustadt, L.L.P.

(57) ABSTRACT

A method of developing a tool for non-destructive inspection of parts of a turbomachine engine is disclosed. The method includes: a) making parts and/or sets of parts of an engine portion by prototyping from a digital model of the engine portion, and then assembling the parts and/or sets of parts in order to make a three-dimensional lifesize mock-up; and b) verifying that it is possible to pass the inspection tool through access orifices and/or passages of the mock-up until a distal end of the tool is situated in the vicinity of a part for inspection, and validating the tool or modifying its configuration or the configuration of the access orifices as a function of the results of the verification.

10 Claims, 2 Drawing Sheets

METHOD OF DEVELOPING AND CALIBRATING A TOOL FOR NON-DESTRUCTIVE INSPECTION OF PARTS OF A TURBOMACHINE

FIELD OF THE INVENTION

The present invention relates to a method of developing and calibrating a tool for non-destructive inspection of parts of an engine, in particular a turbomachine, and also to a three-dimensional lifesize mock-up for performing the method.

BACKGROUND OF THE INVENTION

Non-destructive inspection (NDI) of the parts of an engine enables the state of those parts to be verified without degrading them. Non-destructive inspection techniques include in particular penetrant inspection, magnetoscopy, detecting eddy currents, ultrasound detection, etc.

With a turbomachine engine, it is preferable for inspections to be performed directly on the engine while it is mounted under the wing of an airplane so as to avoid removing the engine and disassembling it at least in part in order to access the parts for inspection. In situ inspection of parts serves to limit the down time of the airplane, and is less expensive. There therefore exists a need for tools that are well adapted to non-destructive in situ inspection of parts of a turbomachine motor of a given type.

The parts for inspection in a turbomachine engine are often situated in zones that are difficult to access by conventional inspection tools. It is necessary to test these tools under real conditions, i.e. on an operational engine, in order to develop the tools, in particular as a function of the environment that is specific to the parts for inspection, and also in order to calibrate the tools.

In the present technique, it is possible to use a digital model of the engine to simulate passing an inspection tool through access orifices and/or passages of the engine until a distal end of the tool is situated at a part for inspection. Nevertheless, that solution does not make it possible to take account of all of the problems associated with the environment of the engine parts, so it is necessary to repeat the test on an operational engine in order to validate the tool. The discovery of problems or difficulties that were not observed beforehand leads to delays in developing the tool and can even lead to certain types of inspection of the part under question being abandoned.

One solution to that problem would be to fabricate a portion of an operational engine solely for the purpose of developing tools for inspecting parts in said engine portion. Nevertheless, the real parts needed are not always available and the cost of such a technique would be prohibitive. It is also possible to envisage making said engine portion out of parts that have been rejected, thereby reducing the cost of fabrication. Nevertheless, that would make it necessary for said engine portion to be made only after engine design and construction had taken place, thereby making it necessary to test and develop inspection tools after such engines have been built, and that presents many drawbacks.

On the contrary, it is desirable for inspection tools to be developed in parallel with the design and construction of the first engines that are to be sold, in such a manner that the non-destructive inspection of parts of said engines can be defined and made available to the purchasers of engines with it being guaranteed that they will function properly.

OBJECT AND SUMMARY OF THE INVENTION

A particular object of the invention is to provide a solution to this problem that is simple, effective, and inexpensive.

To this end, the invention provides a method of developing a tool for non-destructive inspection of an engine, in particular a turbomachine, wherein the method comprises the steps consisting in:

a) making parts and/or sets of parts of an engine portion by prototyping from a digital model of said engine portion, and then assembling said parts and/or sets of parts in order to make a three-dimensional lifesize mock-up; and b) verifying that it is possible to pass the inspection tool through access orifices and/or passages of the mock-up until a distal end of the tool is situated in the vicinity of a part for inspection, and validating the tool or modifying its configuration or the configuration of the access orifices as a function of the results of said verification.

The method of the invention thus comprises essentially two steps: a step a) in which a three-dimensional (3D) lifesize mock-up is made of a portion of the engine by assembling together parts and/or sets of parts made by prototyping from a digital model of said portion of the engine, such as computer-assisted design (CAD) files of the engine, and then a second step in which it is verified that the inspection tool can pass through the access orifices and/or passages of the mock-up until its distal end is situated in the vicinity of the part for inspection. In the event of this verification being successful, the inspection tool is validated. Otherwise, the configuration of the inspection tool and/or the access orifices and passages of the mock-up may be modified so as to facilitate insertion of the inspection tool into the mock-up all the way to the part for inspection.

The mock-up of the invention is true to the environment of the engine and it is made by prototyping, which is less expensive than fabricating an engine portion dedicated to developing tools for non-destructive inspection. The mock-up may be made before the engine is fabricated and relatively quickly. The mock-up is non-operational, unlike an engine portion dedicated to developing an inspection tool, of the kind used in the prior art.

At least some of the parts of the mock-up are provided with orifices for passing the inspection tool and/or define spaces between one another for passing said tool. The parts and/or the sets of parts of the mock-up are advantageously assembled to one another in releasable manner.

These parts or sets of parts are made using a prototyping technique such as stereolithography or laser sintering, and they are therefore made of plastics material or of metal.

Preferably, the method includes, in step a), a step consisting in making the parts or sets of parts in section on planes containing the axis of the engine and/or of the access orifices, with step b) being performed on said parts or sets of parts in section in order to view the passage of the tool.

According to another characteristic of the invention, the method includes, in step a), a step consisting in taking dimensional tolerances and/or clearances of the digital model of the engine portion into account, so as to make a three-dimensional mock-up having the configuration that is the most unfavorable for passing the inspection tool.

This makes it possible to make a mock-up from the most penalizing configurations of parts, i.e. taking account of dimensional tolerances and assembly clearances of the parts that are the most unfavorable so as to shrink the spaces for passing the inspection tool.

According to another characteristic of the invention, the method includes, in step b), steps consisting in mounting at least one real part in the mock-up, in passing the inspection tool through the access orifices and/or passages of the mock-up until the distal end of said tool is situated in the vicinity of the real part, and then calibrating the tool in situ on the real part. This real part advantageously includes one or more calibrated defects. The method of the invention then enables the non-destructive inspection tool to be developed and calibrated.

The present invention also provides a three-dimensional lifesize mock-up of a portion of an engine, in particular of a turbomachine, wherein the mock-up is made up of a plurality of parts and/or sets of parts that are not operational, and at least some of which are removable and replaceable by real parts or by calibration parts.

This mock-up advantageously includes parts or sets of parts that are non-operational and that are in section on planes containing the axis of the engine and/or access orifices.

At least some of the parts and/or some of the sets of parts are made of a material that is transparent or semitransparent, so as to be able to view the inspection tool more clearly while it is being inserted into the mock-up.

The invention also relates to using the above-described three-dimensional mock-up for performing the method of the invention.

Finally, the invention provides the use of the above-described three-dimensional mock-up for training operators in assembling and dismantling the engine portion. The mock-up of the invention enables operators to be trained in assembling and dismantling engine parts without running the risk of damaging real parts, and prior to or in parallel with the step of constructing the engine.

BRIEF DESCRIPTION OF THE DRAWINGS

The invention can be better understood and other details, characteristics, and advantages of the present invention appear more clearly on reading the following description made by way of non-limiting example and with reference to the accompanying drawings, in which.

MORE DETAILED DESCRIPTION

Figure 1:
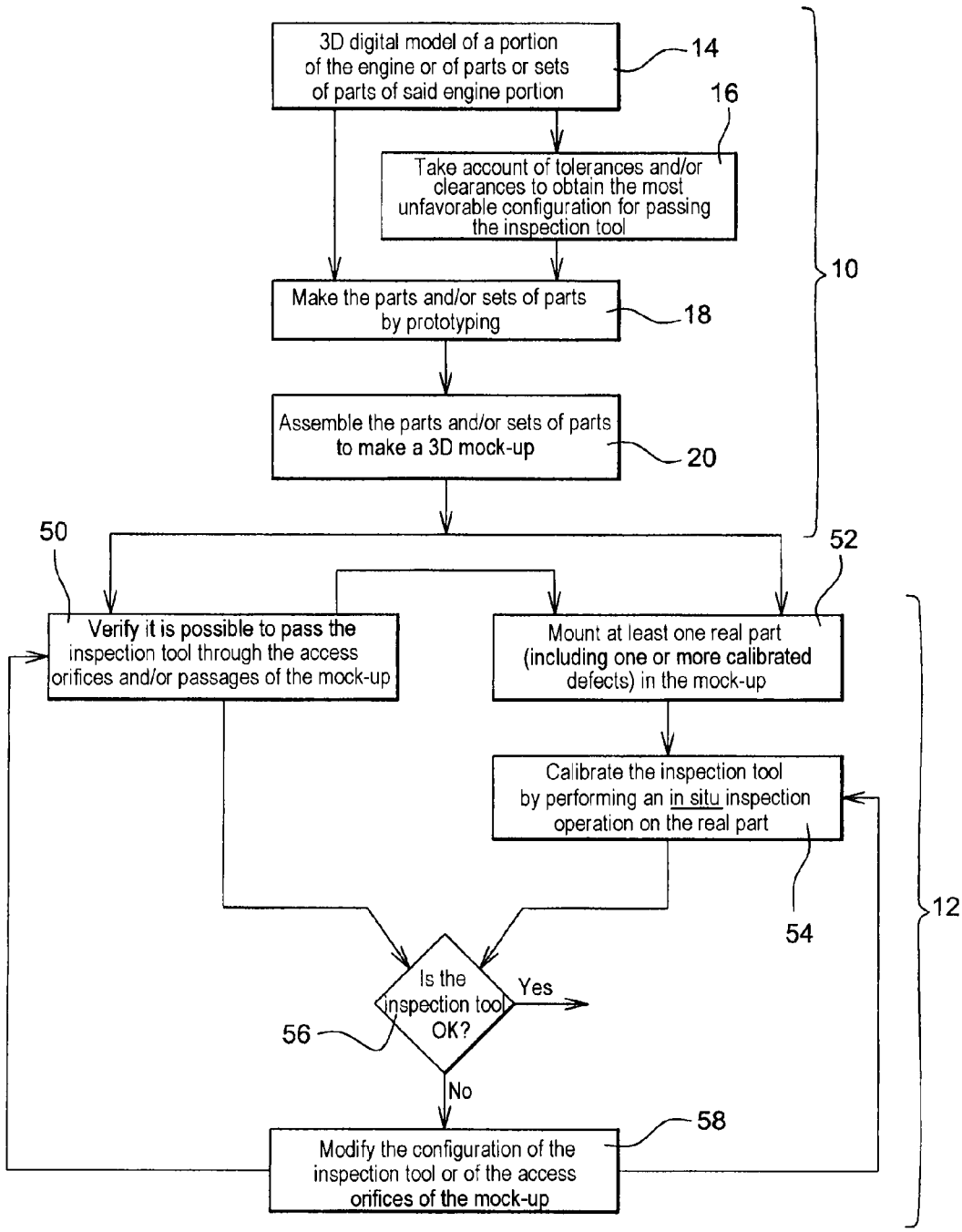
FIG. 1 is a flow chart showing the various steps of the method of the invention for developing a tool for non-destructive inspection of engine parts.

FIG. 1 is a flow chart showing the various steps of the method of the invention for developing and calibrating a tool for non-destructive inspection of engine parts, in particular of a turbomachine.

The method essentially comprises two steps 10 and 12: a first step 10 in which a non-operational three-dimensional lifesize mock-up of an engine portion is made by assembling parts and/or sets of parts that are fabricated by prototyping from a digital model of the engine, and then a second step 12 in which an inspection tool is inserted into the mock-up through access orifices and/or passages thereof in order to validate or modify the mock-up and then to calibrate it.

The first step 10 comprises substeps 14, 16, 18, and 20, consisting initially in a substep 14 of establishing a three-dimensional (3D) digital model of the engine portion or of the parts and/or sets of parts of said engine portion. This digital model comprises CAD files of the above-mentioned portion of the engine and serves to provide a three-dimensional representation of the engine portion, as shown in FIG. 2.

Figure 2:
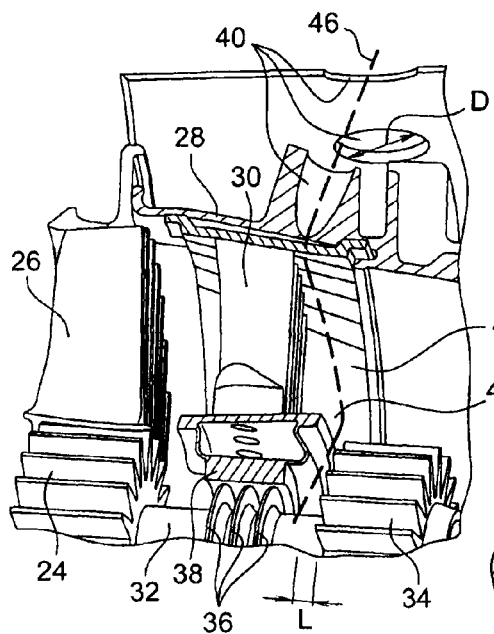
FIG. 2 is a diagrammatic perspective view of a portion of a turbomachine engine, in a CAD format.

In the example of FIG. 2, this engine portion is a low-pressure turbine stage having a disk 24 carrying an annular row of blades 26 rotating inside a substantially cylindrical casing 28 and an annular row of stator vanes 30 situated downstream from the disk 24 and carried at their radially outer ends by the casing 28.

The disk 24 is connected by a cylindrical wall 32 to another disk 34 situated downstream from the stator vanes 30. This cylindrical wall 32 carries outer annular wipers 36 that co-operate with blocks 38 of abradable material fastened to the inner periphery of the stator vanes 30, so as to form a labyrinth type seal.

The casing 28 has a plurality of cylindrical walls extending one inside another and including orifices 40 for passing an inspection tool that is represented diagrammatically by dashed lines 46.

When the wipers 36 of the seal are to be inspected by means of the tool 46, the tool is generally of elongate shape and is manipulated from its proximal end in order to pass through certain orifices 40 in the walls of the casing 28, through the annular space 42 that extends axially between the trailing edges of the stator vanes 30 and the leading edges of the moving blades carried by the disk 34, and then through the annular space 44 that extends axially between the downstream edge of the inner platform of the stator vanes 30 and the upstream edge of the disk 34 until its distal end is situated level with the wipers 36 of the seal.

The CAD files of the engine portion include the dimensional tolerances and the clearances between the various parts of this engine portion. An optional substep 16 of the method of the invention may consist in taking these tolerances and clearances into account so as to make a mock-up that presents the configuration that is the most unfavorable for passing the inspection tool.

By way of example, orifices 40 of diameter D may have a diameter of 0.95 D in the mock-up. The annular space 44 between the downstream end of the inner platform of the stator vanes 30 and the upstream edge of the disk 34 presents an axial dimension L, and in the mock-up it may be given an axial dimension of 0.9 L.

Step 10 of the method then consists in a substep 18 in making the part and/or the sets of parts in this engine portion by prototyping. Any prototyping technique may be used, such as stereolithography that makes it possible to obtain parts and/or sets of parts that are made of plastics material and therefore light in weight, or by laser sintering that enables the parts and/or sets of parts to be obtained that are made of metal using a metal powder that is heated by the energy of a laser, etc.

The first step 10 of the method then includes a substep 20 that consists in assembling together the parts and/or sets of parts in order to construct the three-dimensional mock-up.

Figure 3:
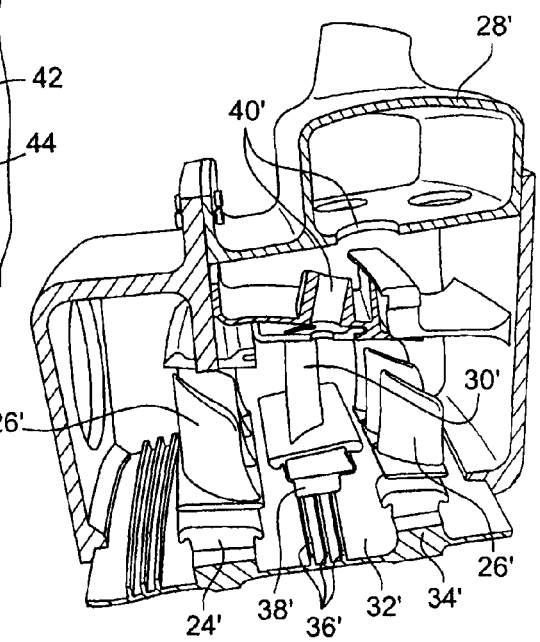
FIG. 3 is a diagrammatic perspective view of a three-dimensional mock-up of the FIG. 2 engine portion.

In the example of FIG. 3, the 3D mock-up of the low-pressure turbine portion shown in FIG. 2 has been made.

The various parts and/or sets of parts in the mock-up are advantageously fastened to one another in releasable manner. This applies to the stator vanes 30' that are made integrally with the blocks of abradable material 38' but that are releasably fastened to the casing 28'. The rotor blades 26' are also releasably mounted on the disks 24' and 34', which are reconstructed in part in the mock-up and made integrally with the wall 32' and the wipers 36'.

When the engine portion under consideration is a segment or annular section of axis that corresponds to the longitudinal axis of the engine, it is possible to make a mock-up that corresponds to an annular sector only of the section. For this purpose, the method consists in making the parts or sets of parts that are sectioned on planes containing the axis of the engine and/or the access orifices.

Making only an annular sector of the engine portion makes it possible to visualize more clearly the various parts of the mock-up and the path followed by the inspection tool 46' in order to access the parts for inspection (specifically the wipers 36'). The section planes in FIG. 3 contain the longitudinal axis of the engine and the orifices 40' for passing the tool 46'.

The second step 12 of the method of the invention essentially consists in verifying that it is possible to pass the inspection tool 46' into the mock-up and in validating or modifying the tool as a function of the results of the verification, and then in calibrating it.

This second step comprises five substeps 50, 52, 54, 56, and 58 that are described in detail below.

Figure 4:
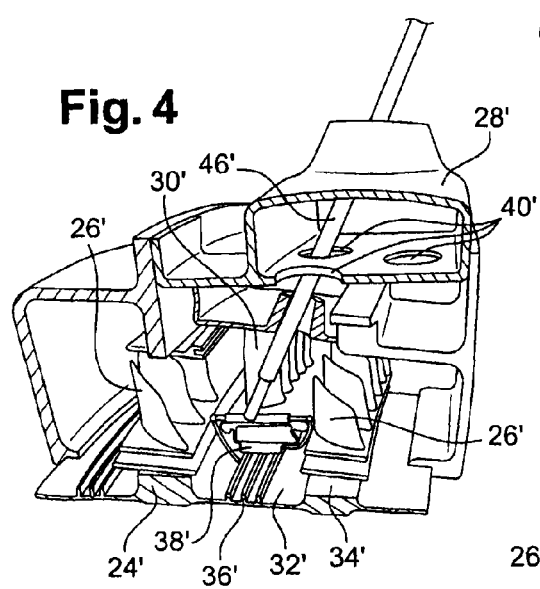
FIGS. 4 and 5 are diagrammatic perspective views of the FIG. 3 mock-up respectively showing the steps of the method of the invention for verifying and calibrating an inspection tool.

Initially (substep 50), the tool 46' is inserted into the mock-up through the orifices 40' of the casing 28' (FIG. 4). For this purpose, the tool 46' is manipulated from its proximal end so that its distal end is situated level with the parts for inspection, here the wipers 36'.

When the tool 46' is fitted at its distal end with a contact measurement probe, of the eddy current probe type, the distal end must be capable of pressing against the wipers 36' or against a zone close thereto.

If the distal end of the tool comes close to the wipers 36' without difficulty, then the configuration of the tool is validated in a substep 56, and the tool may then be calibrated. Otherwise, a substep 58 consists in modifying the shape and/or the dimensions of the tool and/or the dimensions or the positions of the access orifices in the mock-up, so as to facilitate passage of the tool up to the wipers 36', and then substep 50 is repeated.

Calibration of the tool 46' (substep 54) is preceded by a substep 52 in which at least one real part or calibration part is mounted in the mock-up taking the place of the corresponding part or set of parts.

Figure 5:
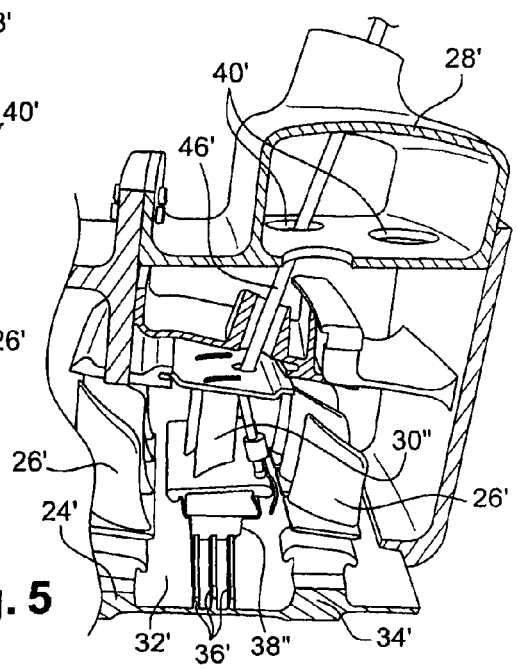

In the example of FIG. 5, the assembly formed by the stator vanes 30', their platform carrying the blocks 38' of abradable material, and their fastener means engaging the casing 28' is replaced by similar real parts 30", 38" that include calibrated defects. These real parts fit perfectly to the mock-up because the mock-up is made accurately and at life size.

The tool 46' is inserted into the mock-up during substep 54, as described above, in order to detect the calibrated defects in the real parts 30" and 38". When these calibrated defects are detected without difficulty, then the tool may be validated during substep 56. Otherwise, it may be necessary to modify its shape and/or its dimensions or indeed the dimensions of the access orifices 40' in the mock-up, during substep 58, after which substep 50 or 54 is repeated.

The method of the invention makes it possible to test and/or calibrate any type of non-destructive inspection tool, whether operating by magnetoscopy, penetrant inspection, ultrasound, eddy currents, etc.

What is claimed is:

1. A method of developing a tool for non-destructive inspection of an engine, the method comprising:
    a) making parts and/or sets of parts of an engine portion by prototyping from a digital model of said engine portion, and assembling said parts and/or sets of parts to make a three-dimensional lifesize mock-up; and
    b) verifying that passing the inspection tool through access orifices and/or passages of the mock-up until a distal end of the tool is situated in a vicinity of a part for inspection is possible, and validating the tool or modifying a configuration of the tool or a configuration of the access orifices as a function of results of said verifying.

2. The method according to claim 1, wherein the parts and/or sets of parts are made of a plastics material by stereolithography, or out of metal by laser sintering.

3. The method according to claim 1, further comprising, in step a), making the parts and/or sets of parts in section on planes containing an axis of the engine and/or of the access orifices, with step b) being performed on said parts and/or sets of parts in section in order to view the passing of the tool.

4. The method according to claim 1, further comprising, in step a), taking dimensional tolerances and/or clearances of the digital model of the engine portion into account, so as to make a three-dimensional mock-up having a configuration that is least favorable for passing the inspection tool.

5. The method according to claim 1, further comprising, in step b), mounting at least one real part in the mock-up; passing the inspection tool through the access orifices and/or passages of the mock-up until the distal end of said tool is situated in a vicinity of the real part; and calibrating the tool in situ on the real part.

6. The method according to claim 5, wherein the real part includes one or more calibrated defects.

7. The method according to claim 1, wherein the engine is a turbomachine.

8. The method according to claim 1, wherein said parts and/or sets of parts are not operational and at least some of said parts and/or sets of parts are removable and replaceable by real parts or by calibration parts.

9. The method according to claim 1, wherein the inspection tool is of elongate shape.

10. The method according to claim 1, wherein a proximal end of the inspection tool is manipulated when the inspection tool passes through the access orifices and/or passages of the mock-up.

* * * * *